United States Patent [19]

Holtzberg et al.

[11] Patent Number: 4,458,555

[45] Date of Patent: Jul. 10, 1984

[54] COMPOSITE CONNECTING ROD AND PROCESS

[75] Inventors: Matthew W. Holtzberg, Ringwood, N.J.; Billy W. Cole, Naperville, Ill.

[73] Assignee: Standard Oil Company (Indiana), Chicago, Ill.

[21] Appl. No.: 387,321

[22] Filed: Jun. 11, 1982

[51] Int. Cl.³ .................. G05G 1/00; B22D 19/02
[52] U.S. Cl. .................. 74/579 E; 29/156.5 A; 123/197 AB
[58] Field of Search ........... 74/579 E; 123/197 AB, 123/197 AC; 29/156.5 A

[56] References Cited

U.S. PATENT DOCUMENTS

| | | | |
|---|---|---|---|
| 3,748,304 | 7/1973 | Stephens | 528/210 |
| 4,016,140 | 4/1977 | Morello | 264/331.19 |
| 4,216,682 | 8/1980 | Ban et al. | 74/579 E |
| 4,224,214 | 9/1980 | Chen | 264/325 |
| 4,350,056 | 9/1982 | Ban et al. | 74/579 E |

OTHER PUBLICATIONS

Wise, Charles, "Plastic Engine is Off and Running", *Machine Design*, vol. 52, No. 10, (May 8, 1980), pp. 24–26.

*Primary Examiner*—William A. Cuchlinski, Jr.
*Attorney, Agent, or Firm*—Thomas W. Tolpin; William T. McClain; William H. Magidson

[57] ABSTRACT

A lightweight composite connecting rod is provided to decrease fuel consumption, attenuate noise, and permit increased speed of operation.

24 Claims, 4 Drawing Figures

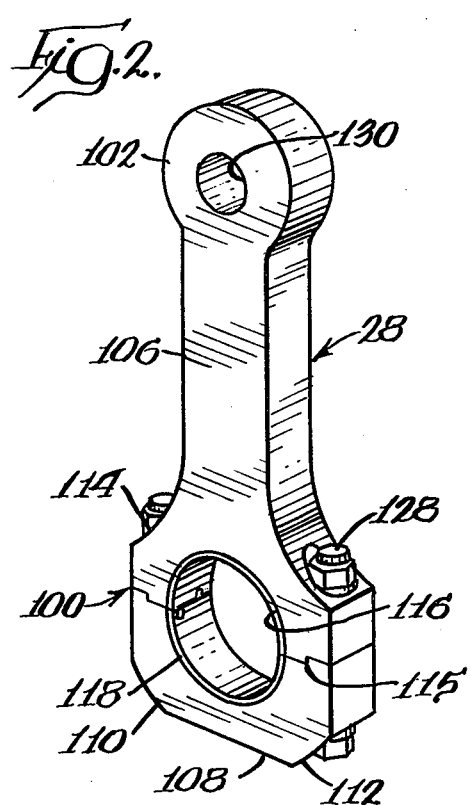
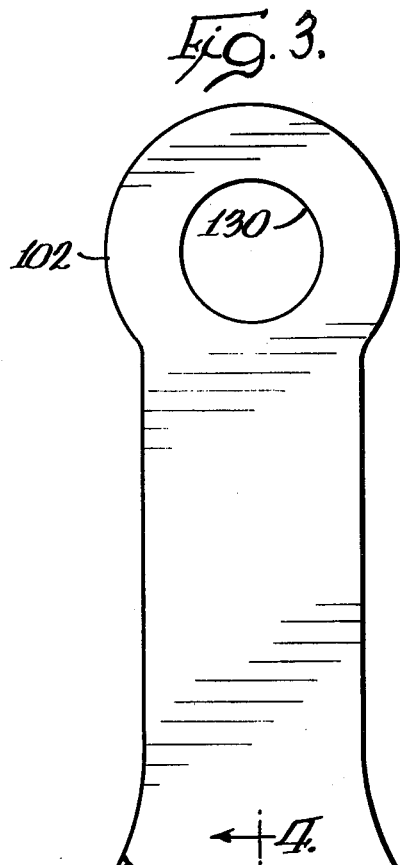
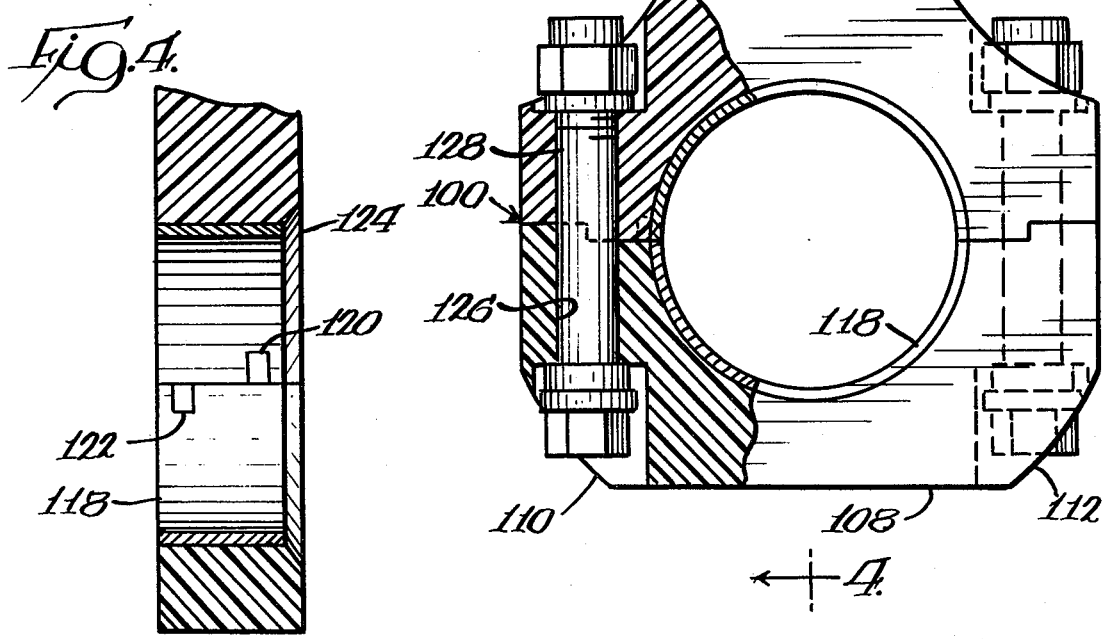

COMPOSITE CONNECTING ROD AND PROCESS

BACKGROUND OF THE INVENTION

This invention relates to engines, and more particularly, to engine parts and a process for making the same.

Traditionally, engines have been made of metal, usually steel or cast iron. Steel and cast iron engines are useful, except they are quite heavy and consume considerable amounts of gasoline or diesel fuel. Conventional engines exert large compressive forces, considerable torque, and substantial secondary harmonic vibrations which have to be dampened by counterbalancing pistons, flywheels, dampeners, etc. The moving metal parts of cast iron and steel engines generate high centrifugal, reciprocating, and inertial forces, momentum, and loads. Generally, the weight of the engine adversely affects its performance, efficiency, and power.

Recently, it has been suggested to use plastic engine parts in automotive engines. Such suggestions have appeared in the December 1980 issue of *Automotive Industries* at pages 40–43, in an article entitled, "What . . . a Plastic Engine!?"; in the May 8, 1980 issue of *Machine Design*, Volume 52, No. 10, in an article entitled, "Plastic Engine Is Off And Running," and in French Application No. 2,484,042, published Dec. 11, 1981.

An experimental prototype engine with concealed plastic engine parts was displayed at the Society of Automotive Engineers' (SAE) Show in Detroit, Mich. in February 1980.

Over the years, amide-imide polymers have been developed for use in molding and producing various products, such as wire coatings, enamels, films, impregnating materials, and cooking utensils. Typifying these prior art amide-imide products, polymers and molding processes are those described in U.S. Pat. Nos. 3,546,152; 3,573,260; 3,582,248; 3,660,193; 3,748,304; 3,753,998; 4,016,140; 4,084,144; 4,136,085; 4,186,236; 4,167,620; and 4,224,214. These prior art products, polymers, and molding processes have met with varying degrees of success.

It is, therefore, desirable to provide a lightweight engine part.

SUMMARY OF THE INVENTION

An improved lightweight composite engine part is provided for use in gasoline and diesel powered automotive engines, truck engines, aircraft engines, marine engines, single and two cylinder engines, such as lawn mower engines, portable generators, and other internal combustion engines. The lightweight composite engine part decreases gasoline and fuel consumption, attentuates noise for quieter performance, and permits increased speed of operation. The lightweight composite engine part produces higher horsepower for its weight than conventional engine parts, while maintaining its shape, dimensional stability, and structural integrity at engine operating conditions. The lightweight composite engine part decreases centrifugal, reciprocating, and inertial forces, momentum, and load on the engine.

The composite engine part has a greater strength-to-weight ratio than metal, is flame resistant, and is stable to heat. The composite engine part is capable of effectively functioning at engine operating temperatures and start-up conditions during hot and cold weather. The composite engine part has high mechanical strength, thermal stability, fatigue strength, and excellent tensile, compressive, and flexural strength. The composite engine part is resistant to wear, corrosion, impact, rupture, and creep, and reliably operates in the presence of engine fuels, oils, and exhaust gases.

In contrast to metals, such as cast iron, steel, aluminu, titanium, and to thermosetting resins, such as epoxy resin, the composite engine part can be injection molded. Injection molding permits closer tolerances with less secondary machining operations for production efficiency and economy. Finished surfaces of injected molded composite engine parts are of better quality and have fewer knit lines, seams, and flashes than do engine parts made from cold metal forging, casting, fabrication, or other conventional techniques. If desired, some of the composite engine parts can be insert molded or compression molded.

The lightweight composite engine part is made of durable, impact-resistant, hybrid or composite material which includes special proportions of an amide-imide resinous polymer, preferably reinforced with graphite and/or glass fibers. The amide-imide resinous polymer can also be blended with polytetrafluoroethylene (PTFE) and/or titanium dioxide. Composite engine parts which are laminated, injection molded or otherwise made from amide-imide resinous polymers have better elongation, stiffness, moduli, and strength at engine operating conditions than do other plastics, such as epoxy resin, polyimides, aramides, polyphenylene sulfide, polytetrafluoroethylene, and nylon. A particularly suitable amide-imide resinous polymer is commercially available from Amoco Chemicals Corporation under the trademark and product designation TORLON.

In the invention of this invention, the composite engine part takes the form of an amide-imide resinous polymeric connecting rod. The thermoplastic connecting rod has a split crankshaft-receiving end, a wrist pin-receiving end, and an elongated intermediate connecting member extending between and connecting the crankshaft-receiving end and the wrist-pin receiving end. The split crankshaft-receiving end has a detachable portion and an attached portion which is integrally connected to the intermediate member. The detachable portion and the attached portion cooperate with each other to define a crankshaft hole which pivotally receives the crankshaft and to define longitudinally aligned bolt holes. The wrist pin-receiving portion defines a wrist pin hole which pivotally receives the wrist pin. Fasteners, such as bolts, are inserted in the bolt holes to secure the detachable portion to the attached portion about the crankshaft. The attached and detachable portions preferably have interlocking shoulders to minimize lateral movement between the two portions. In the preferred form, a metal bushing is mounted in the wrist pin hole and a split metal bearing is mounted in the crankshaft hole.

Desirably, the composite connecting rod is laminated for increased strength and has a plurality of plies. Each ply has an amide-imide resinous polymeric layer and a fabric layer of graphite and/or glass fibers.

In the preferred process, each ply is formed by coating a woven or fibrous graphite fabric with an amide-imide resinous polymeric coating. The plies are then dried and stacked in a preform fixture. A weight is then placed on the blank (stack) to apply a pressure, and the weighted blank is staged and consolidated by heating the weighted blank in an oven. After the weight is removed from the staged blank, the blank is compressed in a hot platen press to fully consolidate, heat and laminate (mold) the blank. Thereafter, the molded laminate is cooled below its plastic deformation temperature in the platen press. The cooled molded laminate is removed from the press and subsequently post cured by solid state polymerization to increase its strength.

The post cured connecting rod is machined. The machining operations include drilling the wrist pin hole, crankshaft hole, and bolt holes, and splitting the crankshaft end of the connecting rod at a location generally bisecting the crankshaft hole to form the detachable portion. Preferably, the crankshaft hole is opened in the longitudinal direction by drilling or honing to form an oval crankshaft hole before the crankshaft end is split. Because some material is lost during splitting, such as by sawing, the hole will become circular when the detachable and attached portions are bolted together. In the illustrated process, the post cured blank is profiled on a milling machine after the blank is placed in a pattern or fixture.

Composite connecting rods decrease secondary harmonic vibrations, fluttering, and engine shaking, and enhance more efficient combustion temperatures.

A more detailed explanation of the invention is provided in the following description and appended claims taken in conjunction with the accompanying drawings.

BRIEF DESCRIPTION OF THE DRAWINGS

FIG. 2 is a perspective view of the composite connecting rod;

FIG. 3 is an enlarged front view of the composite connecting rod with portions shown in cross-section for ease of understanding and for clarity; and FIG. 4 is a cross-sectional view of the composite connecting rod taken substantially along line 4—4 of FIG. 3.

DETAILED DESCRIPTION OF THE PREFERRED EMBODIMENT

Figure 1:
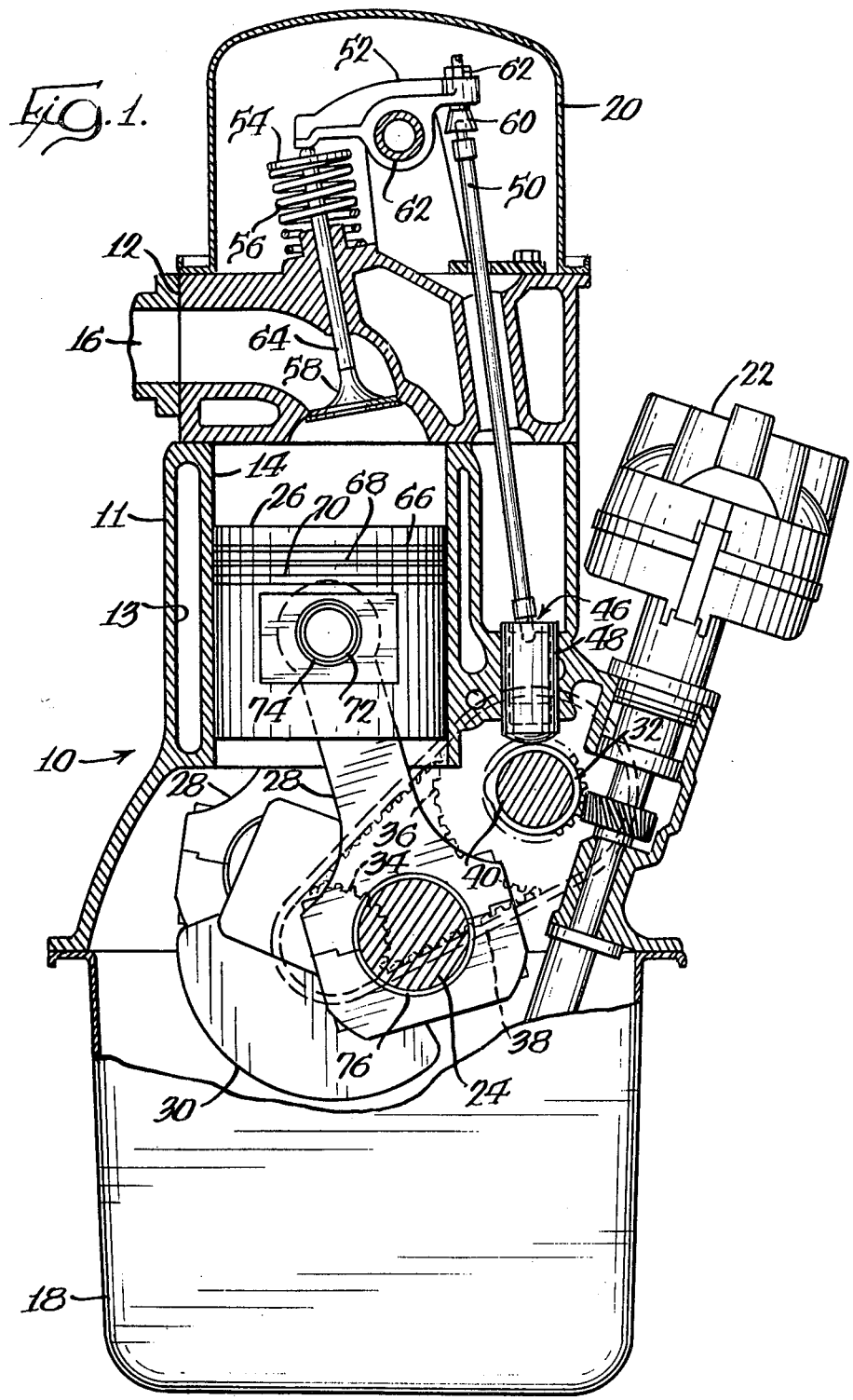
FIG. 1 is a cross-sectional view of an automotive engine with a composite connecting rod in accordance with principles of the present invention.

The automotive engine 10 of FIG. 1 has lightweight composite engine parts to reduce its weight, decrease fuel consumption, and improve engine performance. Engine 10 is a gasoline powered, four stroke, spark ignition engine. The illustrated engine is a V-6 engine with 6 cylinders arranged in a V-shaped firing pattern.

While the composite engine parts are described hereinafter with particular reference to the illustrated engine, it will be apparent that the engine parts can also be used in other types of gasoline powered automotive engines, as well as in diesel powered automotive engines, truck engines, aircraft engines, marine engines, locomotive engines, lawn mower engines, portable generators, and other internal combustion engines. The composite engine parts can be used in 1, 2, 4, 6, 8 or more cylinder engines including V-arranged cylinder engines, aligned cylinder engines, horizontally opposed cylinder engines, rotary engines, etc.

As shown in FIG. 1, engine 10 has a cast iron block 11 and head 12. The block has many chambers including a cooling chamber 13 and six combustion chambers 14 which provide cylinders. The head has an exhaust manifold and an intake manifold 16 which communicate with the cylinders and an overhead carburetor (not shown). Extending below the block is an oil pan 18. Extending above the head is a rocker arm cover 20. A distributor 22 with an internal set of spark plugs (not shown) is provided to ignite the gaseous air mixture in the cylinders.

A metal crankshaft 24 drives the pistons 26 through connecting rods 28. A counterweight 30 on crankshaft 24 balances the pistons. The crankshaft 24 drives a metal camshaft 32 through a set of timing gears 34 and 36. The timing gears include a crankshaft gear or drive pulley 34 mounted on the crankshaft 24, and a camshaft gear or driven pulley 36 mounted on the camshaft 32. A fabric reinforced, rubber timing belt 38 or timing chain drivingly connects the crankshaft gear 34 and the camshaft gear 36. The camshaft gear 36 has twice the diameter and twice as many teeth as the crankshaft gear 34, so that the camshaft 18 moves at one-half the speed of the crankshaft. In some types of engines, the crankshaft gear drives the camshaft gear directly without a timing belt or timing chain.

Metal cams 40 are mounted on the camshaft 32 to reciprocatingly drive the valve trains 46. There are two or four valve trains per cylinder depending on the type of engine. Each valve train has a valve lifter 48, a push rod 50, a rocker arm 52, a valve spring retainer 54, a compression spring 56, and a valve 58 which opens and closes the exhaust manifold or the intake manifold 16. The intake valve 58 opens and closes the intake manifold 16. The exhaust valve opens and closes the exhaust manifold. The lifter 48 rides upon and follows the cam 40. The push rod 50 is seated in a recess of the lifter and is connected to the rocker arm 52 by a threaded stud 60 and nut 62. The bottom end of the stud 60 is shaped complementary to the top end of the push rod to securely receive and engage the push rod. The rocker arm 52 pivots upon a rocker arm shaft, fulcrum or pin 62 and reciprocatingly drives the valve stem 64 of the valve 58.

The piston 26 reciprocatingly slides against a metal liner that provides the cylinder walls. A set of piston rings is press fit or snap fit on the head of the piston. The piston rings include a compression ring 66, a barrier ring 68, and an oil scraper ring 70. The piston is pivotally connected to the connecting rod 28 through a wrist pin 72 and a bushing 74. The connecting rod is pivotally connected to the crankshaft 24 through a split ring metal bearing 76.

In a four stroke internal combustion engine, such as the illustrated engine, each piston has an intake stroke, a compression stroke, a power stroke, and an exhaust stroke. During the intake stroke, the piston moves downward and the inlet valve is opened to permit a gaseous air mixture to fill the combustion chamber. During the compression stroke, the intake and exhaust valves are closed and the piston moves upward to compress the gaseous air mixture. During the power stroke, the spark plug is ignited to combust the gaseous air mixture in the combustion chamber and the rapidly expanding combustion gases drive the piston downward. During the exhaust stroke, the exhaust valve is opened and the piston moves upward to discharge the combustion gases (exhaust gases).

The pistons, as well as connecting rods, wrist pins, barrier piston rings, push rods, rocker arms, valve spring retainers, intake valves, and timing gears, can be made of metal, although it is preferred that they are at least partially made of a thermoplastic, amide-imide resinous polymer to reduce the weight of the engine. Such amide-imide engine parts are referred to as composite engine parts. In some engines, the exhaust valve can also be at least partially made of a thermoplastic, amide-imide resinous polymer.

As shown in FIGS. 2 and 3, the composite, hybrid, thermoplastic, amide-imide resinous polymeric connecting rod 28 has a split crankshaft-receiving end 100, a wrist pin-receiving end 102, and an elongated intermediate connecting member 106 extending between and connecting the crankshaft-receiving end 100 and the wrist pin-receiving end 102. The split crankshaft-receiving end 100 has a generally U-shaped detachable portion 108 with beveled or tapered sides 110 and 112, and an inverted, generally U-shaped attached portion 114 integrally connected to the intermediate connecting member 106. The attached and detachable portions have interlocking shoulders 115 to substantially minimize lateral movement between those portions. Alternatively, a dowel rod can be used. The detachable portion and the attached portion cooperate with each other to define a crankshaft hole 116. A split metal bearing 118 is preferably mounted in the crankshaft hole. As shown in FIG. 4, the bearing can have ears or teeth 120 and 122 which bite into the wrist pin hole wall. One or both sides of the crankshaft hole can be countersunk to define a recess 124 (FIG. 4). Longitudinally aligned bolt holes 126 (FIG. 3) extend through the detachable portion 100 to receive bolts 128.

The wrist pin-receiving portion 102 has a wrist pin hole 130. A metal or plastic bushing can be mounted in the wrist pin hole. The wrist pin hole and bushing receive the wrist pin.

In the preferred embodiment, the composite connecting rod 28 is laminated and has a plurality of plies. Each ply has an amide-imide resinous polymeric laminar layer or matrix and a woven fabric laminar layer or unidirectional tape of a fibrous reinforcing material comprising graphite fibers and/or glass fibers. Most preferably, the fabric layer is made of interwoven and crossed graphite fibers for increased strength. Desirably, 10% to 50% by weight of the graphite fabric layers are positioned at 45° orientation relative to the longitudinal axis to increase the bending strength of angled portions of the connecting rod. The laminated connecting rod comprises 55% to 75%, preferably 65%, by weight reinforcing material, preferably graphite fibers, and 25% to 45%, preferably 35%, by weight thermoplastic, amide-imide resinous polymer. The preferred polymer is formed by dissolving 30% by weight solids amide-imide resinous polymer with about 70% by weight solvent of n-methyl-2-pyrrolidone. In some circumstances, it may also be desirable to mold the connecting rod out of 30% to 100% by weight thermoplastic, amide-imide resinous polymer.

The composite laminated connecting rod is approximately 70% lighter than conventional metal connecting rods. Advantageously, the composite laminated connecting rod maintains its shape and structural integrity at engine operating conditions. The coefficient and rate of thermal expansion and contraction of the amide-imide polymeric connecting rod are similar to those of the split metal bearing and metal bushing, so that the resinous connecting rod expands and contracts compatibly with the split metal bearing and metal bushing at engine operating conditions.

The plies are each formed by coating the fabric weave of graphite fibers with an amide-imide resinous polymeric coating or solution to form a ply 13 mils thick. The plies are then dried in an oven at 300° F. for about 16 hours. Afterwards, the dried plies are stacked in a preform fixture to form the laminated blank. In the preferred process, there are 72 plies in the laminated blank.

A deadweight is then placed upon the blank to apply a light pressure of 1 psi to the stack. The weighted blank is then heated in an oven at about 500° F. for about two hours to consolidate (compress) the blank and stage the polymer in order to increase the polymer's molecular weight and decrease the polymer's reactivity.

After the staged and consolidated blank is removed from the oven, the weight is removed, and the blank is placed in a hot platen press and consolidated (compressed) at 1,500 psi to 5,000 psi at 650° F. from about 2 minutes to about 15 minutes to mold and laminate the blank. The molded blank is then cooled to about 400° F. under a full pressure of about 1,500 psi to 5,000 psi in the platen press, and subsequently taken out of the mold (demolded). Preferably, the graphite fibers are interwoven and crossed for increased strength.

The cooled molded engine part providing the blank is then post cured by solid state polymerization by progressively heating the molded engine part below its melting temperature to enhance its dimensional strength and integrity. The specific time and temperatures depend upon the desired size of the molded part.

In the preferred method of post curing, the molded engine part is preheated in the presence of a circulating gas in an oven for a period of time such that a major portion of the volatiles contained in the injection molded engine part are vaporized and removed, while simultaneously increasing the deflection temperature of the polymer from about 15° F. to 35° F. without deformation of the engine part. Preheating can be carried out by heating the molded part from an initial temperature to a final temperature with either continuous or stepwise increases in temperature over a period of time, or at a single temperature, for a sufficient time to vaporize and remove the volatiles and increase the polymer's heat deflection temperature.

Imidization, cross-linking and chain extension take place during preheating. Continuous or stepwise preheating increases tensile strength and elongation properties of the molded engine parts.

In order to enhance the physical properties of smaller molded engine parts, it is preferred to continuously preheat the molded part from an initial temperature of 300° F. to 330° F. to a final preheating temperature of 460° F. to 480° F. for about 40 to 60 hours. Alternatively, the molded engine part can be preheated in a stepwise manner from an initial preheating temperature of 300° F. to 330° F. for 20 to 30 hours to a final preheating temperature of 410° F. to 430° F. for 20 to 30 hours.

Generally, the molded part is heated (post cured) at a temperature of about 330° F. for 24 hours, about 475° F. for 24 hours, and about 500° F. for 24 hours. More specifically, the molded article is heated in the presence of a circulating gas at about 5° F. to 25° F., and preferably about 5° F. to 15° F., below the increased deflection temperature of the polymer for a period of time such that substantial imidization, chain extension and cross-linking take place without distortion of the molded article.

As a result of such heating, water and gases continue to be generated and removed, and the molecular weight and deflection temperature of the polymer are increased. Heating is continued for a period of time sufficient to increase the deflection temperature by about 15° F. to 35° F. Preferably, the heating is at a temperature ranging from about 450° F. to 490° F. for a period of at least 20 hours. Thereafter, the temperature is increased to about 5° F. to 25° F. below the polymer's new deflection temperature and held at the new temperature for a sufficient time to increase the polymer's deflection temperature by about 15° F. to 35° F. Preferably, such heating is at about 480° F. to 520° F. for a period of at least 20 hours.

Heating is continued in this manner to increase the polymer's deflection temperature to its maximum attainable value without deformation of the molded article. The final heating stage is carried out at about 5° F. to 25° F., and preferably from about 5° F. to 15° F., below the maximum attainable temperature for at least 20 hours, and most preferably at least 40 hours. The heated part is then cooled.

In order to best enhance the physical properties of the molded engine part, it is preferred to heat the molded part from about 460° F. to about 480° F. for about 20 to 30 hours, then from about 490° F. to 510° F. for about 20 to 30 hours, and subsequently from about 495° F. to about 525° F. for about 20 to 60 hours.

Post curing should be carried out in the presence of a circulating gas which flows through and around the molded engine part to remove water and gases from the polymeric resin. The amount of circulation and the circulation flow pattern should be coordinated to maximize removal of water and the gases without causing substantial variations in temperature. While inert gases, such as nitrogen, can be used, it is preferred that the circulating gas be an oxygen-containing gas, most preferably air, because oxygen tends to facilitate cross-linking of the polymer molecules. Post curing is preferably carried out in a circulating air oven, although it can be carried out in any other suitable apparatus.

Post cured engine parts are resistant to thermal shock at temperatures of at least 500° F. and exhibit significantly improved tensile strength and elongation as compared with untreated molded, amide-imide resinous engine parts. A more detailed explanation of heat treatment by post curing is described in Chen U.S. Pat. No. 4,167,620, which is hereby incorporated by reference.

After the molded engine part is post cured, the rough shape of the connecting rod is trepanned or cut. Thereafter, undersized, wrist pin and crankshaft holes are drilled in the molded blank to fit the molded blank on a fixture or pattern. The outside profile of the connecting rod is then cut on a milling machine while the molded blank is in the fixture. Next, the crankshaft hole is opened with an end mill to form an oval or elliptical-shaped hole which is elongated in the longitudinal direction. The crankshaft end of the connecting rod is then sawed off, cut, or otherwise split, preferably by bisecting the crankshaft hole and forming steps or shoulders along the split to minimize slippage and lateral movement between the severed pieces. When the severed detachable portion and attached portion are put back together, the crankshaft hole becomes circular because of loss of material during sawing. After the severed portions are clamped together, longitudinally aligned bolt holes are drilled through the crankshaft portion. Afterwards, the molded connecting rod is ground to the desired thickness and subsequently bolted together. The crankshaft hole and wrist pin hole are then honed to the desired size, and the bushing and split bearing are inserted in the wrist pin hole and crankshaft hole, respectively.

While the machining operations described above are preferably conducted after the injection molded engine part is post cured, one or more of these machining operations can be conducted before post curing if desired.

The composite engine part and the thermoplastic, amide-imide resinous polymer contained therein substantially maintain their shape, dimensional stability and structural integrity at engine operating conditions. Usual engine operating temperatures do not exceed 350° F. Oil cooled engine operating temperatures range from about 200° F. to 250° F. Advantageously, the composite thermoplastic, amide-imide resinous, polymeric engine part is impervious and chemically resistant to oil, gasoline, diesel fuel, and engine exhaust gases at engine operating conditions.

The thermoplastic resin in the composite engine is preferably reinforced with graphite fibers and/or glass fibers. In molded parts the fibers have an average length of 6 to 10 mils and a preferred diameter of about 0.2 to 0.4 mils. The ratio of the length to diameter of the fibers is from 2 to 70, averaging about 20. While the above fiber lengths and diameters are preferred for best structural strength, other lengths and diameters can be used, if desired. The graphite fibers can be generally continuous, granulated or chopped and can be optionally sized or coated with a polysulfone sizing or some other polymer which will maintain its structural integrity at engine operating conditions. The glass fibers can be generally continuous, milled or chopped and can be sized with silane or some other polymer that maintains its structural integrity at engine operating conditions. Chopped graphite and glass fibers are preferably sized, while granulated graphite fibers are preferably unsized.

The polymer's molding characteristics and molecular weight can be controlled to facilitate polymerization with an additional monomer, such as trimellitic acid (TMA), and can be prepared with the desired flow properties by the methods described in Hanson U.S. Pat. No. 4,136,085, which is hereby incorporated by reference.

The polymer can be blended with graphite, glass, PTFE, and titanium dioxide by the method described in Chen U.S. Pat. No. 4,224,214, which is hereby incorporated by reference.

The amide-imide polymers are prepared by reacting an aromatic polycarboxylic acid compound (acyl halide carboxylic acid and/or carboxylic acid esters) having at least three carboxylic acid groups such as trimellitic acid (TMA), 4-trimellitoyl anhydride halide (4-TMAC), pyromellitic anhydride, pyromellitic acid, 3,4,3',4' benzophenone tetracarboxylic acid or an anhydride thereof, or oxybis benzene dicarboxylic acid or an anhydride thereof.

The amide-imide polymers are preferably prepared by reacting an acyl halide derivative of an aromatic tricarboxylic acid anhydride with a mixture of largely- or wholly-aromatic primary diamines. The resulting products are polyamides wherein the linking groups are predominantly amide groups, although some may be imide groups, and wherein the structure contains free carboxylic acid groups which are capable of further reaction. Such polyamides are moderate molecular weight polymeric compounds having in their molecule units of:

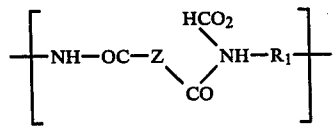

and units of:

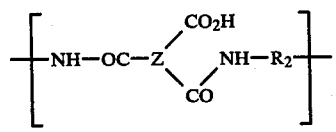

and, optionally, units of:

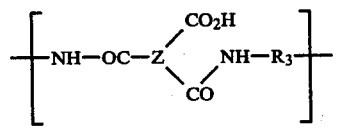

wherein the free carboxyl groups are ortho to one amide group, Z is an aromatic moiety containing 1 to 4 benzene rings or lower-alkyl-substituted benzene rings, $R_1$, $R_2$ and $R_3$ are different and are divalent wholly- or largely-aromatic hydrocarbon radicals. These hydrocarbon radicals may be a divalent aromatic hydrocarbon radical of from 6 to about 10 carbon atoms, or two divalent aromatic hydrocarbon radicals each of from 6 to about 10 carbon atoms joined directly or by stable linkages such as —O—, methylene, —CO—, —SO$_2$—, —S—; for example, —R'—O—R'—, —R'—CH$_2$—R'—, —R'—CO—R'—, —R'—SO$_2$—R'— and —R'—S—R'—.

The polyamides are capable of substantially complete imidization by heating by which they form the polyamide-imide structure having to a substantial extent reoccurring units of:

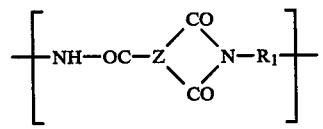

and units of:

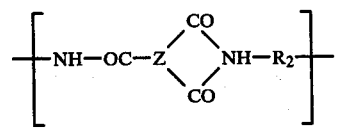

and, optionally, units of:

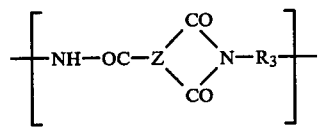

wherein one carbonyl group is meta to and one carbonyl group is para to each amide group and wherein Z, $R_1$, $R_2$ and $R_3$ are defined as above. Typical copolymers of this invention have up to about 50 percent imidization prior to heat treatment, typically about 10 to about 40 percent.

The polyamide-imide copolymers are prepared from an anhydride-containing substance and a mixture of wholly- or partially-aromatic primary diamines. Usefully the anhydride-containing substance is an acyl halide derivative of the anhydride of an aromatic tricarboxylic acid which contains 1 to 4 benzene rings or lower-alkyl-substituted benzene rings and wherein two of the carboxyl groups are ortho to one another. More preferably, the anhydride-containing substance is an acyl halide derivative of an acid anhydride having a single benzene or lower-alkyl-substituted benzene ring, and most preferably, the substance is the acyl chloride derivative of trimellitic acid anhydride (4-TMAC).

Usefully the mixture of diamines contains two or more, preferably two or three, wholly- or largely-aromatic primary diamines. More particularly, they are wholly- or largely-aromatic primary diamines containing from 6 to about 10 carbon atoms or wholly- or largely-aromatic primary diamines composed of two divalent aromatic moieties of from 6 to about 10 carbon atoms, each moiety containing one primary amine group, and the moieties linked directly or through, for example, a bridging —O—, —S—, —SO$_2$—, —CO—, or methylene group. When three diamines are used they are preferably selected from the class composed of:

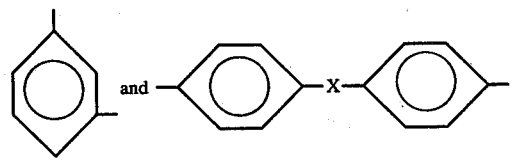

said X being an —O—, —CH$_2$—, or —SO$_2$— group. More preferably, the mixture of aromatic primary diamines is two-component and is composed of meta-phenylenediamine (MPDA) and p,p'-oxybis(aniline) (OBA), p,p'-methylenebis(aniline) (MBA), and p,p'-oxybis(aniline), p,p'-sulfonylbis(aniline) (SOBA), and p,p'-oxybis(aniline), p,p'-sulfonylbis(aniline) and meta-phenylenediamine, or p,p'-sulfonylbis(aniline) and p,p'-methylenebis(aniline). Most preferably, the mixture of primary aromatic diamines contains meta-phenylenediamine and p,p'-oxybis(aniline). The aromatic nature of the diamines provides the excellent thermal properties of the copolymers while the primary amine groups permit the desired imide rings and amide linkages to be formed.

When two diamines are used to achieve a polymer usefully combining the properties of both diamines, it is usual to stay within the range of about 10 mole % of the first diamine and 90 mole % of the second diamine to about 90 mole % of the first diamine and 10 mole % of the second diamine. Preferably the range is about a 20 to 80 mole ratio to about an 80 to 20 mole ratio. In the preferred embodiment wherein the acyl chloride of trimellitic acid anhydride is copolymerized with a mixture of p,p'-oxybis(aniline) and meta-phenylenediamine, the preferred range is from about 30 mole % of the former and about 70 mole % of the latter to about 70 mole % of the former and about 30 mole % of the latter.

Although embodiments of the invention have been shown and described, it is to be understood that various modifications and substitutions, as well as rearrangements of structural features and/or process steps, can be made by those skilled in the art without departing from the novel spirit and scope of this invention.

What is claimed is:

1. A composite engine part, comprising:
   a laminated amide-imide resinous polymeric connecting rod comprising a plurality of plies, each ply having an amide-imide resinous polymeric matrix with a fabric layer comprising a fibrous reinforcing material selected from the group consisting essentially of graphite and glass, said laminated amide-imide connecting rod having a split crankshaft-receiving end, a wrist pin-receiving end and an elongated intermediate connecting member extending between and connecting said crankshaft-receiving end and said wrist pin-receiving end, said split crankshaft-receiving end having a detachable portion and an attached portion integrally connected to said intermediate member, said detachable portion and said attached portion cooperating with each other to define a crankshaft hole for pivotally receiving a crankshaft and longitudinally aligned bolt holes, said wrist pin-receiving portion defining a wrist pin hole for pivotally receiving a wrist pin, and said laminated amide-imide connecting rod maintaining its structural integrity at engine operating conditions; and
   fastening means comprising bolts insertable in said bolt holes for securing said detachable portion to said attached portion about a crankshaft.

2. A composite engine part in accordance with claim 1 including a metal bushing mounted in said wrist pin hole and a split metal bearing mounted in said crankshaft hole.

3. A composite engine part in accordance with claim 1 wherein said attached portion of said laminated connecting rod comprises a generally U-shaped attached portion, said detached portion of said laminated connecting rod comprises an inverted generally U-shaped detached portion, and said attached and detachable portions of said laminated amide-imide connecting rod have interlocking shoulders for substantially minimizing lateral movement between said attached and detachable portions when secured about said crankshaft.

4. A composite engine part in accordance with claim 1 wherein said laminated connecting rod comprises from 55% to 75% by weight of said reinforcing material.

5. A composite engine part in accordance with claim 4 wherein said laminated connecting rod comprises about 65% by weight of said reinforcing material.

6. A composite engine part in accordance with claim 5 wherein said reinforcing material comprises graphite.

7. A composite engine part in accordance with claim 6 wherein said polymer comprises a product of about a 30% by weight of amide-imide resinous polymer and about a 70% by weight solvent of n-methyl-2-pyrrolidone.

8. A composite engine part in accordance with claim 1 wherein said connecting rod comprises a reaction product of a trifunctional carboxylic acid compound and at least one diprimary aromatic diamine.

9. A composite engine part in accordance with claim 8 wherein said connecting rod comprises at least one of the following moieties:

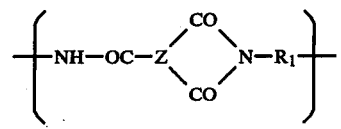

and

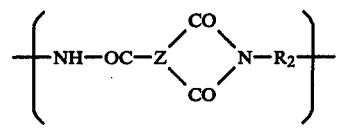

wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

10. A composite engine part in accordance with claim 9 wherein $R_1$ is

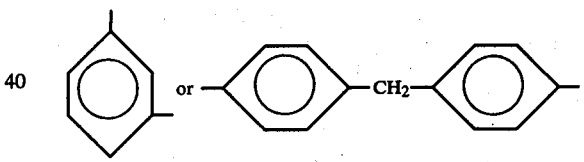

and $R_2$ is

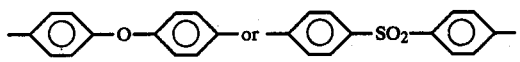

or wherein $R_1$ is

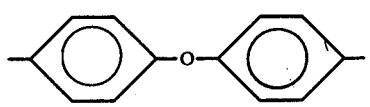

and $R_2$ is

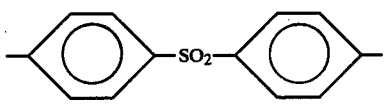

11. A composite engine part in accordance with claim 9 wherein Z is a trivalent benzene ring, $R_1$ is $R_2$ is

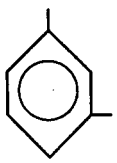

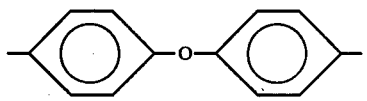

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

12. A composite engine part in accordance with claim 1 wherein said connecting rod comprises from 30% to 100% by weight amide-imide resinous polymer.

13. A process for forming a composite laminated connecting rod for use in an engine, comprising the steps of:
forming a stack having a plurality of plies including
forming each ply by coating a fabric comprising graphite fibers with an amide-imide resinous polymer, drying each ply, and stacking said dried plies in a preform fixture;
applying pressure to said stack of plies by placing a weight upon said stack of plies;
staging said pressured stack of plies by heating said pressured stack of plies in an oven to consolidate said stack of plies and form an amide-imide blank;
removing said weight;
laminating said amide-imide blank by consolidating said amide-imide blank in a platen press and heating said amide-imide blank in said platen press;
cooling said laminated amide-imide in said platen press to below its plastic deformation temperature;
removing said cooled laminated amide-imide blank from said press;
post curing said cooled laminated amide-imide blank by solid state polymerization to increase the strength and integrity of said laminated amide-imide blank;
cutting the outside profile of a connecting rod in said post cured laminated amide-imide blank;
drilling a wrist pin hole, a crankshaft hole and bolt holes in said post cured laminated amide-imide blank;
splitting said post cured laminated amide-imide blank by substantially bisecting said crankshaft hole to form a generally U-shaped detachable portion and an inverted generally U-shaped attached portion; and
bolting said detachable portion to said attached portion of said laminated amide-imide blank to form said composite connecting rod.

14. A process in accordance with claim 13 including inserting a bushing in a wrist pin hole and a split metal bearing in said crankshaft hole.

15. A process in accordance with claim 13 including longitudinally opening said crankshaft hole to form an oval hole before said splitting, and said splitting includes sawing.

16. A process in accordance with claim 15 wherein said cutting includes cutting said post cured blank with a pattern on a milling machine to form said outside profile of said connecting rod, and grinding said laminated cut blank.

17. A process in accordance with claim 13 including 72 plies about 13 mils thick, drying said plies at about 300° F. for about 16 hours, heating said blank in an oven at about 500° F. for about 2 hours, heating said blank in said platen press at about 650° F. from about 2 minutes to 15 minutes at about 1,500 psi to 5,000 psi, and cooling said blank in said press to about 400° F. at about 1,500 psi to 5,000 psi.

18. A process in accordance with claim 13 wherein said ply comprises 55% to 75% by weight of said graphite and 25% to 45% by weight amide-imide resinous polymer.

19. A process in accordance with claim 18 wherein said ply comprises about 65% by weight graphite.

20. A process in accordance with claim 19 wherein said polymer is prepared by dissolving about 30% by weight of an amide-imide resinous polymeric material with about 70% by weight of a solvent comprising n-methyl-2-pyrrolidone.

21. A process in accordance with claim 18 wherein said amide-imide polymer is prepared by reacting a trifunctional carboxylic acid compound with at least one diprimary aromatic diamine.

22. A process in accordance with claim 18 wherein said amide-imide polymer comprises one of the following moieties:

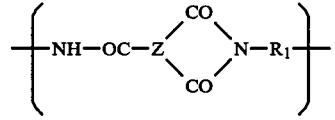

and

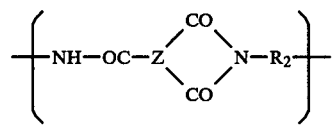

wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

23. A process in accordance with claim 18 wherein $R_1$ is

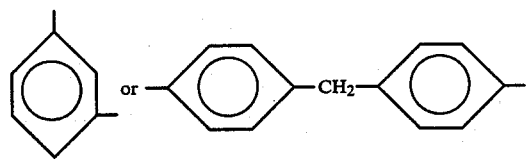

and R<sub>2</sub> is

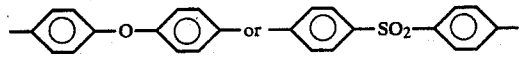

or wherein $R_1$ is

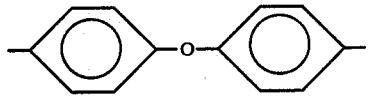

and $R_2$ is

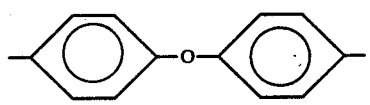

24. A process in accordance with claim 18 wherein Z is a trivalent benzene ring, $R_1$ is

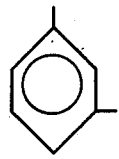

$R_2$ is

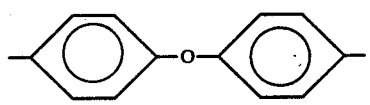

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

* * * * *

UNITED STATES PATENT OFFICE
CERTIFICATE OF CORRECTION

Patent No. 4,458,555  Dated July 10, 1984

Inventor(s) Matthew W. Holtzberg, Billy W. Cole

It is certified that error appears in the above-identified patent and that said Letters Patent are hereby corrected as shown below:

| Column | Line | |
|---|---|---|
| 2 | 4 | reads "aluminu" and should read --aluminum-- |
| 2 | 33 | reads "invention" (second occurrence) and should read --application-- |

Signed and Sealed this

Thirtieth Day of April 1985

[SEAL]

Attest:

DONALD J. QUIGG

Attesting Officer  Acting Commissioner of Patents and Trademarks